United States Patent
Maeda et al.

(10) Patent No.: US 8,860,987 B2
(45) Date of Patent: Oct. 14, 2014

(54) DRIVER PROGRAM

(75) Inventors: Tetsuya Maeda, Osaka (JP); Toru Yasui, Osaka (JP); Kensaku Sugimoto, Osaka (JP)

(73) Assignee: Kyocera Document Solutions Inc. (JP)

( * ) Notice: Subject to any disclaimer, the term of this patent is extended or adjusted under 35 U.S.C. 154(b) by 270 days.

(21) Appl. No.: 13/236,335

(22) Filed: Sep. 19, 2011

(65) Prior Publication Data

US 2012/0092710 A1   Apr. 19, 2012

(30) Foreign Application Priority Data

Oct. 15, 2010   (JP) .................................. 2010-233077

(51) Int. Cl.
*H04N 1/00* (2006.01)
*G06F 3/12* (2006.01)

(52) U.S. Cl.
CPC .......... *G06F 3/1259* (2013.01); *H04N 1/00482* (2013.01); *G06F 3/1207* (2013.01); *G06F 3/1285* (2013.01); *H04N 1/00204* (2013.01); *H04N 2201/0094* (2013.01); *H04N 1/00464* (2013.01); *H04N 1/00474* (2013.01); *H04N 1/00432* (2013.01); *H04N 1/00421* (2013.01); *H04N 2201/0075* (2013.01); *H04N 2201/0039* (2013.01); *G06F 3/1229* (2013.01)
USPC ........................................ 358/1.15; 358/1.14

(58) Field of Classification Search
USPC ............ 726/3; 358/1.13, 404, 444, 1.15, 1.14
See application file for complete search history.

(56) References Cited

U.S. PATENT DOCUMENTS

| | | | | |
|---|---|---|---|---|
| 8,082,323 | B2 * | 12/2011 | Yamaguchi | 709/218 |
| 2004/0213614 | A1 | 10/2004 | Uchida | |
| 2006/0146368 | A1 | 7/2006 | Uchida | |
| 2010/0110491 | A1 * | 5/2010 | Murase | 358/1.15 |
| 2010/0208298 | A1 * | 8/2010 | Kitagata | 358/1.15 |
| 2010/0235883 | A1 * | 9/2010 | Sato | 726/3 |
| 2010/0281351 | A1 * | 11/2010 | Mohammed | 715/205 |
| 2010/0309510 | A1 * | 12/2010 | Hansen | 358/1.15 |
| 2011/0181902 | A1 * | 7/2011 | Chiba et al. | 358/1.13 |
| 2011/0222104 | A1 * | 9/2011 | Mohammad et al. | 358/1.15 |
| 2011/0228311 | A1 * | 9/2011 | Oguma et al. | 358/1.14 |
| 2012/0327439 | A1 * | 12/2012 | Taima | 358/1.13 |

FOREIGN PATENT DOCUMENTS

| | | |
|---|---|---|
| JP | 2004-326603 | 11/2004 |
| JP | 2008-009901 | 6/2006 |
| JP | 2008-040785 | 7/2006 |
| JP | 2006-259520 | 9/2006 |
| JP | 2008-217562 | 3/2007 |

* cited by examiner

Primary Examiner — Jerome Grant, II

(57) ABSTRACT

A non-transitory computer readable medium stores a driver program for an image forming apparatus. The driver program causes the computer to perform the steps of: (a) causing a display device of the computer to display a driver screen that transmits a job request to the image forming apparatus in accordance with a user operation of a user; and (b) if a predetermined user interface element in the driver screen is operated, causing the image forming apparatus to transmit user setting information on the user to the computer and causing the display device of the computer to display a user setting information page that includes the user setting information.

1 Claim, 5 Drawing Sheets

FIG. 5

| HOME | RETURN | UPDATE |
|---|---|---|
| TARO SUZUKI | BASIC INFORMATION | 141 |
| LOGOUT | NAME: TARO SUZUKI<br>LOGIN NAME: SUZUKI<br>PASSWORD: ******<br>AUTHORITY LEVEL: ADMINISTRATOR<br>SECTION NAME: R & D<br>EMAIL ADDRESS: SUZUKI@xxxx.com | |
| MY INFORMATION | MODIFY | |
| JOB STATUS | | |
| DOCUMENT BOX | AUTHORIZATION INFORMATION | 142 |
| ADDRESS BOOK | FUNCTION / AVAILABILITY | |
| SETTING | COPY — ALLOWED<br>COPY (COLOR) — NOT ALLOWED<br>COPY (FULL COLOR) — NOT ALLOWED<br>PRINTER — ALLOWED<br>PRINTER (COLOR) — NOT ALLOWED<br>TRANSMISSION — ALLOWED<br>FACSIMILE TRANSMISSION — ALLOWED<br>BOX STORING — ALLOWED<br>STORING TO REMOVAL MEDIA — ALLOWED | |
| LINK | | |

CUSTOM DOCUMENT BOX — 143

BOX NUMBER: [ ] (DISPLAY)
BOX NAME: [ ] (SEARCH)

| NO | NAME | OWNER | NO OF DOCS | SIZE |
|---|---|---|---|---|
| 0001 | TEAM A | SUGIYAMA | 49 | 19MB |
| 0002 | SUZUKI | SUZUKI | 4 | 1MB |
| 0003 | MAEDA | MAEDA | 7 | 2MB |

DRIVER PROGRAM

CROSS-REFERENCE TO RELATED APPLICATION

This application relates to and claims priority rights from a Japanese Patent Application: No. 2010-233077, filed on Oct. 15, 2010, the entire disclosures of which are hereby incorporated by reference herein.

BACKGROUND OF THE INVENTION

1. Field of the Invention

This invention relates to driver programs.

2. Description of the Related Art

An image forming apparatus such as printer or multifunction peripheral receives a job request of a print job, a facsimile job, or an image-scan job from a driver in a terminal apparatus such as personal computer. In the terminal apparatus, a driver screen of the driver is displayed. A user can input settings for the job such as print setting in the driver screen.

The terminal apparatus may display status information which indicates whether or not a function of the image forming apparatus is in an available status. The terminal apparatus may display a list of document boxes registered in the image forming apparatus.

SUMMARY OF THE INVENTION

Although the terminal apparatus can display some information on the image forming apparatus, when a user requests a job such as printing, it is not easy for the user to cause the image forming apparatus to display the user's unique setting information and request the job under confirming the user's setting information.

The user can request a job under confirming the user's setting information in the following manner. However, it is troublesome for the user. For example, while the user accesses the image forming apparatus to cause the terminal apparatus to display the user's setting information along the aforementioned technique by using predetermined software, the user starts a driver program, inputs print settings etc. in the driver, and then raises a job request having the print settings etc.

This invention has been conceived in order to solve this problem, and provide a driver program which enables a user to request a job with simple user operation under confirming the user's unique setting information.

The present invention solves this subject as follows.

A driver program according to an aspect of this invention causes a computer to perform the steps of: (a) causing a display device of the computer to display a driver screen that transmits a job request to the image forming apparatus in accordance with to a user operation of a user; and (b) causing the image forming apparatus to transmit user setting information on the user to the computer and causing the display device of the computer to display a user setting information page that includes the user setting information, if a predetermined user interface element in the driver screen is operated.

Therefore, when the user raises a job request, one user operation in the driver screen enables to display the user setting information page. Consequently, the user can request a job with simple user operation under confirming the user's unique setting information.

These and other objects, features and advantages of the present invention will become more apparent upon reading of the following detailed description along with the accompanied drawings.

BRIEF DESCRIPTION OF THE DRAWINGS

FIG. 5 shows a diagram that indicates an instance of a user setting information page displayed in the display device by a web browser in response to a user operation to the driver in FIG. 3.

DETAILED DESCRIPTION OF THE PREFERRED EMBODIMENT

Hereinafter, embodiments according to aspects of the present invention will be explained with reference to drawings.

Figure 1:
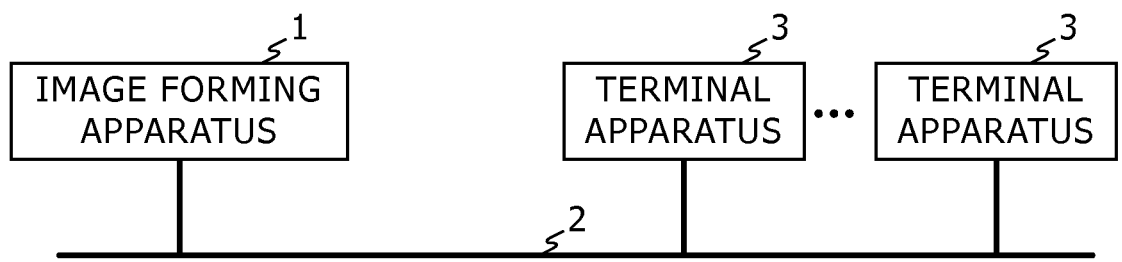
FIG. 1 shows a block diagram that indicates an image forming system having a terminal apparatus in which a driver program has been installed from a computer readable medium according to an embodiment of the present invention.

FIG. 1 shows a block diagram that indicates an image forming system having a terminal apparatus in which a driver program has been installed from a computer readable medium according to an embodiment of the present invention.

In the system shown in FIG. 1, an image forming apparatus 1 is connected to a network 2, and a terminal apparatus 3 is also connected to the network 2. The image forming apparatus 1 is an apparatus such as printer machine, scanner machine, copier, or multifunction peripheral. The image forming apparatus 1 is shared by plural users, and each of the users can use the image forming apparatus 1 by directly operating an operation panel of the image forming apparatus 1 and by remotely operating the terminal apparatus 3 via the network 2. The driver program according to this embodiment has been installed in the terminal apparatus 3.

Figure 2:
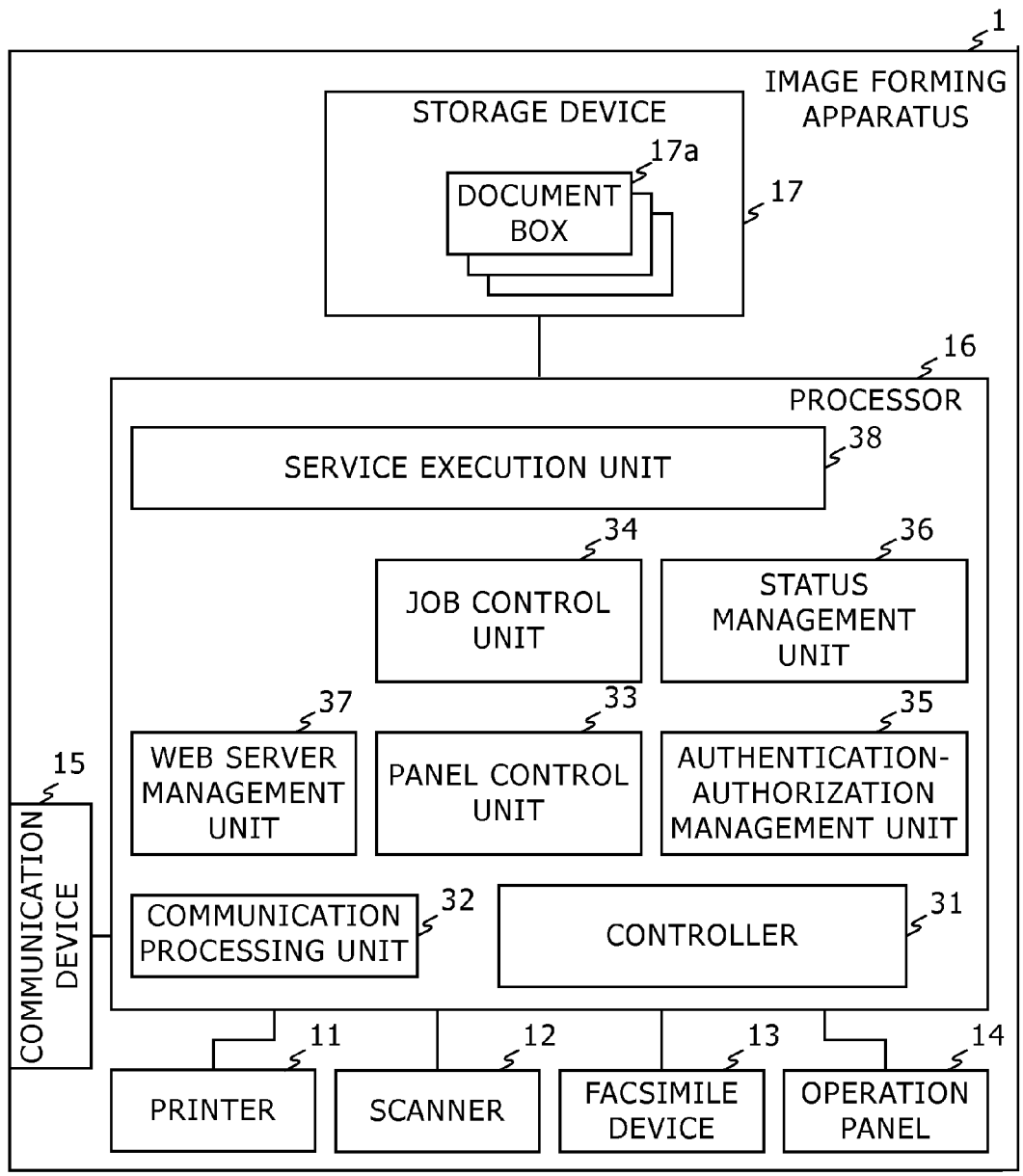
FIG. 2 shows a block diagram that indicates a configuration of the image forming apparatus in FIG. 1.

FIG. 2 shows a block diagram that indicates a configuration of the image forming apparatus 1 in FIG. 1.

The image forming apparatus 1 has a printer 11, a scanner 12, a facsimile device 13, an operation panel 14, a communication device 15, a processor 16, and a storage device 17.

The printer 11 is an internal device which performs printing a document image based on print data. The scanner 12 is an internal device which optically scans a document image from a document, and generates image data of the document image. The facsimile device 13 is an internal device which generates a facsimile signal from image data of a document image to be transmitted and transmits the facsimile signal, and receives a facsimile signal and converts it to image data.

The operation panel 14 is disposed on the case surface of the image forming apparatus 1, and has a display device which displays information to a user and an input device which receives user operation. For example, the display device includes a liquid crystal display, and the input device includes button switches, a touch panel, and so on. The button switches are hardware buttons, and the display device and the touch panel form software buttons. Hence, the operation panel 14 is a user interface of the image forming apparatus 1.

The communication device 15 is connected to the network 2, and performs data communication with other devices (e.g. the terminal apparatus 3) via the network 2 according to a predetermined communication protocol. For example, the communication device 15 is a network interface or a modem.

The processor 16 is a computer which has a CPU (Central Processing Unit), a ROM (Read Only Memory), and a RAM (Random Access Memory), and loads programs into the RAM from the ROM or an unshown memory device and executes the programs by the CPU to form some processing units.

After the image forming apparatus 1 starts, the processor 16 executes some programs as necessary. In this embodiment, the processor 16 forms processing units which include an unshown operating system, a controller 31, a communication processing unit 32, a panel control unit 33, a job control unit 34, an authentication-authorization management unit 35, a status management unit 36, a web server management unit 37, and a service execution unit 38.

The controller 31 is a processing unit which watches and controls internal devices such as the printer 11, the scanner 12, the facsimile device 13, and the operation panel 14. The controller 31 notifies the status management unit 36 of statuses of the internal devices.

The communication processing unit 32 is a processing unit which performs data communication by controlling the communication device 15. The communication processing unit 32 communicates with a driver in the terminal apparatus 3. The communication processing unit 32 has a web server, and communicates with a web browser in the terminal apparatus 3 according to HTTP (Hypertext Transfer Protocol).

The panel control unit 33 is a processing unit which causes the operation panel 14 to display screens, detects a user operation to the operation panel 14, and performs a screen transition according to the user operation by using the controller 31.

The job control unit 34 is a processing unit which executes a job corresponding to a job request received by the service execution unit 38. The job control unit 34 operates the internal device corresponding to the type of the job (e.g. the printer 11) by using the controller 31.

The authentication-authorization management unit 35 performs user authentication, for example, based on user authentication information included in a job request, and determines whether executing a job requested by a user is allowed or not according to authorization information. Therefore, only if the user authentication is successful and executing a job is allowed according to the authorization information, then the job is executed.

The status management unit 36 determines a current status of a job received by the service execution unit 38 from some information such as status information on the internal devices which the controller 31 provides.

When the web server of the communication processing unit 32 receives a transmission request of page data, the web server management unit 37 generates the page data and transmits the page data by the web server of the communication processing unit 32. The web server management unit 37 generates the page data described in HTML (Hypertext Markup Language).

Upon receipt of the transmission request of page data with a predetermined URL (Uniform Resource Locator), the web server management unit 37 generates page data of a user setting information screen which includes user setting information registered in the image forming apparatus 1. For example, the URL in the transmission request has a parameter which indicates a user ID, and the web server management unit 37 generates page data of a user setting information screen on a user associated with the user ID. The user setting information includes authorization information on this user, a list of one or more document boxes which this user can access, and so on. For each of one or more predetermined functions of the image forming apparatus 1, the authorization information indicates whether or not the user is allowed to use the function in the image forming apparatus 1. For example, the authorization information has been registered in a database (not shown), and the web server management unit 37 obtains the authorization information from the database.

The service execution unit 38 receives a job request (printing, copy, facsimile transmission, system setting change, etc.) based on either user operation to the operation panel 14 or a command transmitted from the terminal apparatus 3 via the network 2, and causes to execute a job corresponding to the job request. The service execution unit 38 causes the job control unit 24 to execute a job such as printing, copy or facsimile transmission.

In FIG. 2, the storage device 17 is a non-volatile storage device such as hard disk drive or flush memory, and forms one or more document boxes 17a. In the document box 17a, one or more document data files can be stored. For example, the image forming apparatus 1 is capable of executing a job of printing a document based on a document data file in the document box 17a.

Figure 3:
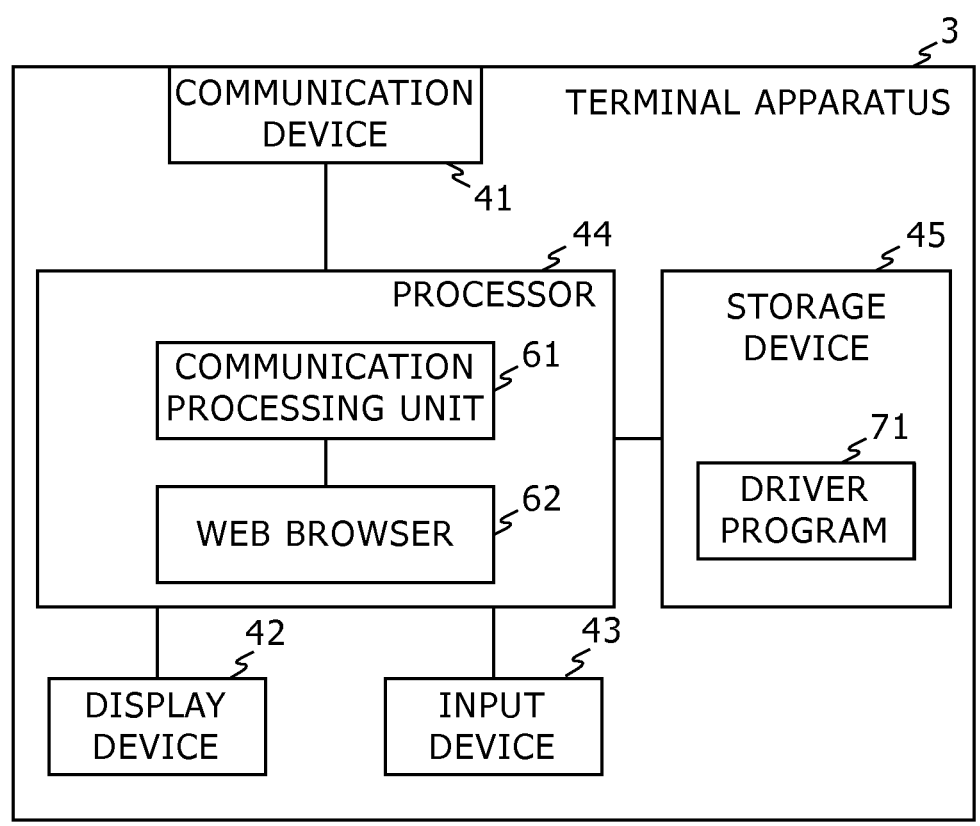
FIG. 3 shows a block diagram that indicates a configuration of the terminal apparatus in FIG. 1.

FIG. 3 shows a block diagram that indicates a configuration of the terminal apparatus 3 in FIG. 1. The terminal apparatus 3 is, for instance, a personal computer having network function in which programs such as an operating system and a web browser has been installed.

The terminal apparatus 3 has a communication device 41, a display device 42, an input device 43, a processor 44, and a storage device 45.

The communication device 41 is connected to the network 2, and performs data communication with other devices (e.g. the image forming apparatus 1) via the network according to a predetermined communication protocol. For example, the communication device 41 is a network interface or a modem.

The display device 42 such as liquid crystal display displays information to a user of the terminal apparatus 3. The input device 43 such as keyboard or mouse receives user operation.

The processor 44 is a computer which has a CPU, a ROM, and a RAM, and loads programs into the RAM from the ROM or an unshown memory device and executes the programs by the CPU to form some processing units.

After the terminal apparatus 3 starts, the processor 44 executes some programs as necessary. In this embodiment, the processor 44 forms processing units which include an unshown operating system, a communication processing unit 61, a web browser 62, and a driver 63.

The communication processing unit 61 is a processing unit which performs data communication by controlling the communication device 41.

The web browser 62 is a processing unit which obtains page data (here, an HTML file) from the web server according to HTTP by using the communication processing unit 61, and causes the display device 42 to display a screen based on the page data.

The driver 63 is a processing unit which the processor forms by executing a driver program 71 in the storage device 45. The driver 63 is a driver for the image forming apparatus 1. The driver 63 performs: (a) causing the display device 42 to display a driver screen that transmits a job request to the image forming apparatus in accordance with a user operation of a user to the input device 43; and (b) causing the image forming apparatus 1 to transmit user setting information on the user to the driver 63 and causing the display device 42 to display a user setting information page that includes the user setting information, if the user operates a predetermined user interface element in the driver screen using the input device 43.

In this embodiment, the user setting information page includes authorization information on the user which is registered in the image forming apparatus 1. Further, in this embodiment, if the user is allowed to access one or more document boxes registered in the image forming apparatus 1, the user setting information page includes a list of the one or more document boxes.

Furthermore, in this embodiment, a user interface element (e.g. operating button) is displayed in a job setting screen for a job request in the driver screen, and if the user operates the user interface element, then the user setting information page which includes the authorization information on the user is displayed.

Furthermore, in this embodiment, if the user operates the user interface element, then the driver 63 starts the web browser 62, and causes the web browser 62 to obtain page data specified by a URL of the image forming apparatus 1 included in the user interface element and to display the user setting information page based on the page data on the display device 42.

Furthermore, in this embodiment, if the user operates the user interface element, then the driver 63 transmits user authentication information on the user to the image forming apparatus 1 for causing the image forming apparatus 1 to transmit the user setting information after user authentication based on the user authentication information.

This user authentication information is, for instance, a user ID, or a pair of a user ID and a password, and has been inputted to the driver in advance and has been maintained in the storage device 45 or the like.

In addition, the aforementioned user interface element has a link to the user setting information page. The driver 63 may generate the link when the driver screen is displayed. For example, the driver 63 may generate the link to the user setting information page by concatenating a predetermined URL (e.g. a URL of a common gateway interface (CGI) in the web server management unit 37 of the image forming apparatus 1) and a user ID as a parameter. Alternatively, the aforementioned user interface element may have the URL of the CGI in the web server management unit 37 of the image forming apparatus 1; and the user ID etc. as one or more parameters may be attached to the URL when requesting page data of the user setting information page.

In FIG. 3, the storage device 45 is a non-volatile storage device such as hard disk drive or flush memory. Alternatively, the driver program 71 may have been recorded in a non-transitory computer readable medium such as portable recording medium (e.g. CD-ROM). The storage device 45 may be such medium and a driving device which reads out the driver program 71 from the medium.

In the following part, operations of the apparatuses 1 and 3 (mainly, the driver 63 of the terminal apparatus 3) in this system are explained.

A user of the terminal apparatus 3 starts the driver 63 by operating the input device 43 to transmit a job request for printing etc. to the image forming apparatus 1.

Upon this user operation, executing the driver program 71 is started, and the driver 63 starts. Upon starting, the driver 63 causes the display device 42 to display a driver screen in which a user interface element is displayed. The user can operate this user interface element by using the input device 43.

Figure 4:
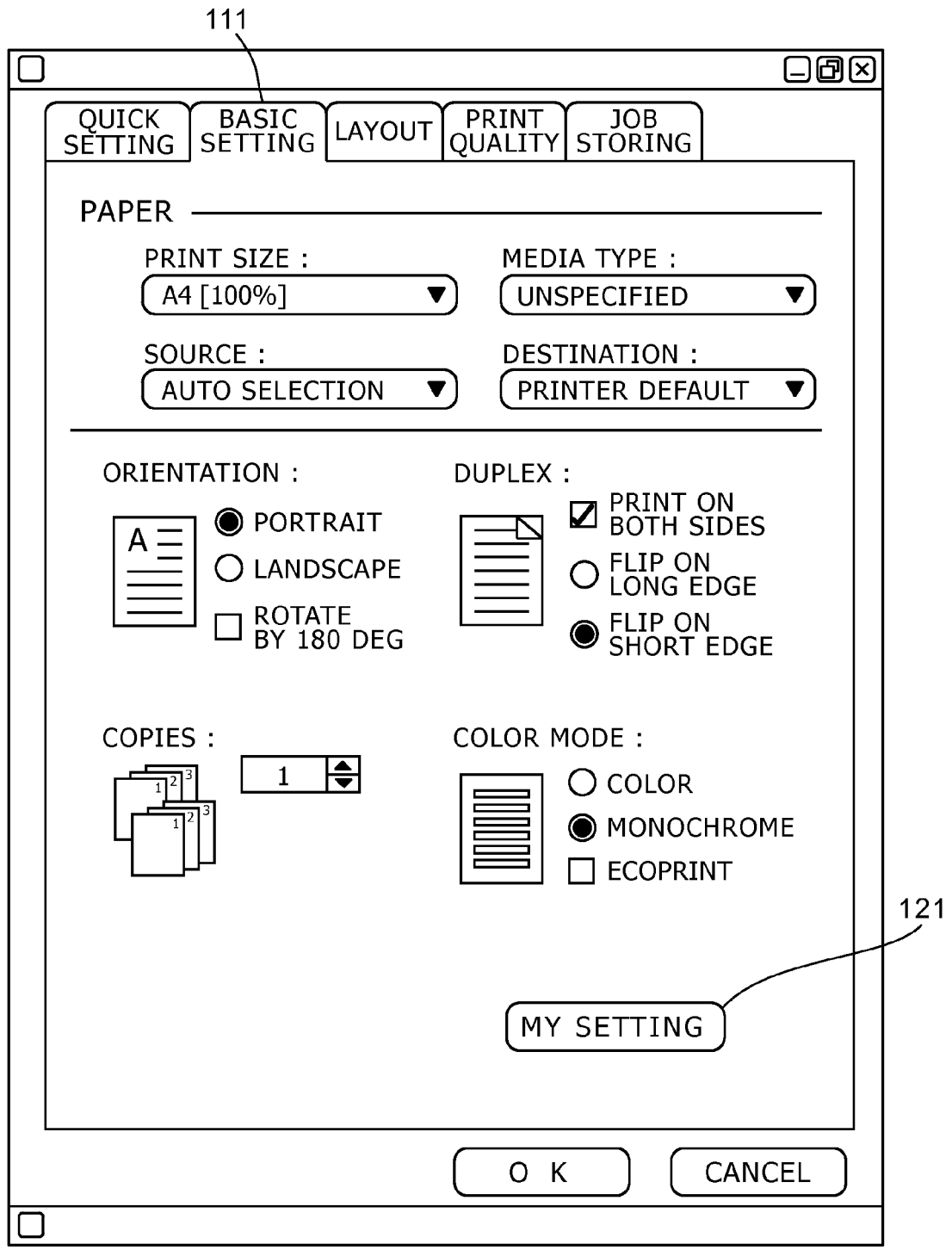
FIG. 4 shows a diagram that indicates an instance of a driver screen displayed in a display device by a driver in FIG. 3.

FIG. 4 shows a diagram that indicates an instance of a driver screen displayed in the display device 42 by the driver 63 in FIG. 3. The driver screen shown in FIG. 4 can be changed to a screen corresponding to a tab chosen from plural tabs by the user. In the status shown in FIG. 4, a setting screen 111 is displayed as the driver screen for job settings of a job request (in FIG. 4, print settings of print job). An operating button 121 is displayed as the user interface element in this setting screen 111.

If the user operates the user interface element in the driver screen (here, the operating button 121) by using the input device 43, then the driver 63 detects this user operation and transmits a transmission request of a user setting information page of this user to the image forming apparatus 1.

In this embodiment, this transmission request is transmitted as an HTTP command. This HTTP command includes a URL of the predetermined CGI with one or more parameters which indicate(s) user authentication information.

This transmission request is transmitted via the network 2 and received by the web server of the communication processing unit 32 in the image forming apparatus 1.

In the image forming apparatus 1, upon receiving this transmission request, the web server management unit 37 extracts the user authentication information from the transmission request, and causes the authentication-authorization management unit 35 to check validity of the user authentication information.

If the authentication-authorization management unit 35 determines that the user authentication information is valid, then the web server management unit 37 obtains authorization information on the user corresponding to the user authentication information, generates a list of one or more document boxes which the user has access authority (i.e. read authority, write authority, etc.) of, and generates page data as an HTML file which includes the authorization information and the list of the one or more document boxes.

Upon generating the page data, the web server management unit 37 transmits the page data to the terminal apparatus 3 which transmitted the transmission request.

In the terminal apparatus 3, the communication processing unit 61 receives the page data, and upon receipt of the page data, the web browser 62 causes the display device 42 to display the user setting information page based on the page data. It should be noted that the web browser 62 may be started by the driver 63 when the transmission request is transmitted, otherwise may be automatically started by the driver 63 or the operating system when the page data is received.

FIG. 5 shows a diagram that indicates an instance of a user setting information page displayed in the display device 42 by the web browser 62 in response to a user operation to the driver 63 in FIG. 3.

In the user setting information page shown in FIG. 5, user setting information on the user "TARO SUZUKI" is displayed. This user setting information page has a basic information frame 141, an authorization information frame 142, and a custom document box frame 143, and includes some information registered in the image forming apparatus 1 about the user "TARO SUZUKI".

The terminal apparatus 3 is capable of the user setting information page together with the driver screen on the display device 42 at the same time. For instance, if the operating system of the terminal apparatus 3 uses a multi-window system, then the driver screen is displayed in a window and the user setting information page is displayed in another window.

According to the aforementioned embodiment, the processor 44 forms the driver 63 by executing the driver program 71 in the storage device 45. The driver 63 performs: (a) causing the display device 42 to display a driver screen for transmitting a job request to the image forming apparatus according to a user operation of a user to the input device 43; and (b) causing the image forming apparatus 1 to transmit user setting information on the user and causing the display device 42 to display a user setting information page which includes the user setting information, if the user operates a predetermined user interface element in the driver screen using the input device 43.

Therefore, when the user raises a job request, one user operation in the driver screen enables to display the user setting information page. Consequently, the user can request a job with simple user operation under confirming the user's unique setting information.

The description of the present invention has been presented for purposes of illustration and description, and is not intended to be exhaustive or limited to the invention in the form disclosed. Many modifications and variations will be apparent to those of ordinary skill in the art.

For example, in the aforementioned embodiment, the user authentication information such as user ID and password is provided to the image forming apparatus 1 when the user setting information is requested. Alternatively, user login may be performed when the driver 63 starts, and under the successful login (i.e. under the successful user authentication), the driver 63 may obtain an authentication token from the image forming apparatus 1 and provide the authentication token as the user authentication information to the image forming apparatus 1.

What is claimed is:

1. A non-transitory computer readable medium storing a driver program for an image forming apparatus, the driver program causing a computer connected to the image forming apparatus through a communication network to perform the steps of:

causing a display device of the computer to display a driver screen that transmits a job request through the communication network to the image forming apparatus in accordance with a user operation of a user; and causing the image forming apparatus to transmit user setting information on the user through the communication network to the computer and causing the display device of the computer to display a user setting information page that includes the user setting information that was registered in the image forming apparatus, if a predetermined user interface element in the driver screen is operated;

wherein:

the user setting information page includes authorization information on the user, and the authorization information is registered in the image forming apparatus and said authorization information includes information that indicates the functions that the user is capable of using on the image forming apparatus and whether or not the user is allowed or not allowed to use each function;

the user setting information page includes a list of one or more document boxes which the user is allowed to access;

the user setting information page is displayed together with the driver screen at the same time in another window than the window in which the driver screen is displayed;

the user interface element is displayed in a job setting screen for the job request in the driver screen such that the user setting information can be displayed by a single operation of the user interface element whereby the user can confirm the user setting information including the authorized information on the user that is registered in the image forming apparatus and the list of one or more document boxes which the user is allowed to access; and if the user interface element is operated, (a) authentication information on the user is transmitted to the image forming apparatus and the image forming apparatus transmits the user setting information to the computer after user authentication based on the authentication information, and (b) a web browser is started in the computer and the web browser obtains page data that is specified by a URL included in the predetermined user interface element from the image forming apparatus and to display the user setting information page based on the page data on the display device of the computer.

\* \* \* \* \*